United States Patent
Cota-Robles et al.

(10) Patent No.: US 10,922,305 B2
(45) Date of Patent: Feb. 16, 2021

(54) MAINTAINING STORAGE PROFILE CONSISTENCY IN A CLUSTER HAVING LOCAL AND SHARED STORAGE

(71) Applicant: VMware, Inc., Palo Alto, CA (US)

(72) Inventors: Erik Cota-Robles, Kirkland, WA (US); Kanika Nema, Pune (IN); Thorbjoern Donbaek Jensen, Hoejbjerg (DK)

(73) Assignee: VMWARE, INC., Palo Alto, CA (US)

( * ) Notice: Subject to any disclaimer, the term of this patent is extended or adjusted under 35 U.S.C. 154(b) by 388 days.

(21) Appl. No.: 15/810,522

(22) Filed: Nov. 13, 2017

(65) Prior Publication Data

US 2018/0081930 A1    Mar. 22, 2018

Related U.S. Application Data

(62) Division of application No. 14/530,430, filed on Oct. 31, 2014, now Pat. No. 9,830,349.

(51) Int. Cl.
| | | |
|---|---|---|
| G06F 9/455 | (2018.01) | |
| G06F 16/23 | (2019.01) | |
| H04L 12/24 | (2006.01) | |
| G06F 9/445 | (2018.01) | |

(52) U.S. Cl.
CPC ...... *G06F 16/2365* (2019.01); *G06F 9/45558* (2013.01); *H04L 41/0853* (2013.01); *H04L 41/0893* (2013.01); *G06F 9/44505* (2013.01); *G06F 2009/45562* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 8,892,504 | B2* | 11/2014 | Wan | G06F 16/254 707/602 |
| 2005/0192992 | A1* | 9/2005 | Reed | G06Q 10/107 |
| 2006/0173900 | A1* | 8/2006 | Dhayalan | G06Q 10/06 |
| 2007/0250784 | A1* | 10/2007 | Riley | G06Q 10/10 715/764 |
| 2008/0270240 | A1* | 10/2008 | Chu | G06Q 10/06375 705/14.11 |
| 2009/0282413 | A1* | 11/2009 | Cialini | G06F 9/4881 718/102 |
| 2010/0287105 | A1* | 11/2010 | Araki | G06Q 10/06 705/300 |
| 2010/0333109 | A1* | 12/2010 | Milnor | G06F 9/4881 718/106 |
| 2011/0029440 | A1* | 2/2011 | Motoyama | G06Q 10/06 705/301 |
| 2011/0288840 | A1* | 11/2011 | Kropinski | G06F 17/5009 703/8 |
| 2012/0311585 | A1* | 12/2012 | Gruber | G06Q 10/06311 718/100 |
| 2014/0033216 | A1* | 1/2014 | Wang | G06F 9/48 718/102 |
| 2014/0047228 | A1* | 2/2014 | Attar | G06F 9/44505 713/2 |

(Continued)

*Primary Examiner* — Wilson Lee

(57) ABSTRACT

A task list can list tasks to be performed on a target host machine. Certain tasks in the task list can be revised to produce a revised task list. Tasks directed to storage devices can be revised depending on whether or not the storage devices are shared by both the target host machine and a reference host machine.

20 Claims, 9 Drawing Sheets

(56) References Cited

U.S. PATENT DOCUMENTS

| | | | | |
|---|---|---|---|---|
| 2014/0325331 A1* | 10/2014 | Madireddi | ............ | G06F 17/243 715/224 |
| 2015/0067687 A1* | 3/2015 | Turner | .................. | G06F 9/4881 718/102 |
| 2015/0082431 A1* | 3/2015 | Davis | .................. | H04L 63/1425 726/23 |
| 2015/0269508 A1* | 9/2015 | Damboritz | ....... | G06Q 10/06311 705/2 |
| 2015/0347987 A1* | 12/2015 | Ali | ..................... | G06Q 10/1097 705/7.21 |

\* cited by examiner

MAINTAINING STORAGE PROFILE CONSISTENCY IN A CLUSTER HAVING LOCAL AND SHARED STORAGE

CROSS REFERENCE TO RELATED APPLICATIONS

This application is a divisional application and, pursuant to 35 U.S.C. § 120, is entitled to and claims the benefit of earlier filed application U.S. application Ser. No. 14/530,430 filed Oct. 31, 2014, the content of which is incorporated herein by reference in its entirety for all purposes.

BACKGROUND

Virtual machine computing environments are often used to implement datacenters to enable information technology (IT) organizations to deliver flexible and reliable IT services. However, as the infrastructure in a virtual machine (VM) computing environment expands to meet the growing needs of a datacenter, it can become increasingly difficult and time consuming to configure multiple host machines in similar ways. Existing per-host processes typically involve repetitive and error-prone configuration steps. As a result, maintaining configuration consistency and correctness across a datacenter requires increasing amounts of time and expertise, leading to increased operational costs.

A process called host profiling can facilitate the installation and management of a complex virtual machine computing environment. Host profiling can capture the blueprint of a known, validated reference host configuration, including components such as networking, storage, security, and other settings. Such a reference profile may call out the devices and configurations that other host machines in a cluster of host machines should have. A system administrator in a datacenter can use host profiling to establish standard configurations for host machines and automate compliance to these configurations, thus simplifying operational management of large-scale environments and reducing errors caused by misconfigurations.

Host profiling can replace per-host, manual, or UI-based host configuration, and maintain configuration consistency and correctness across the datacenter. The system administrator can use host profiling to automate host configuration across a large number of hosts and clusters and thus reduce the time spent on configuring and deploying new host machines. Host profiling can facilitate monitoring for host configuration errors and deviations, and detect and report configuration errors so that remedial action can be taken.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
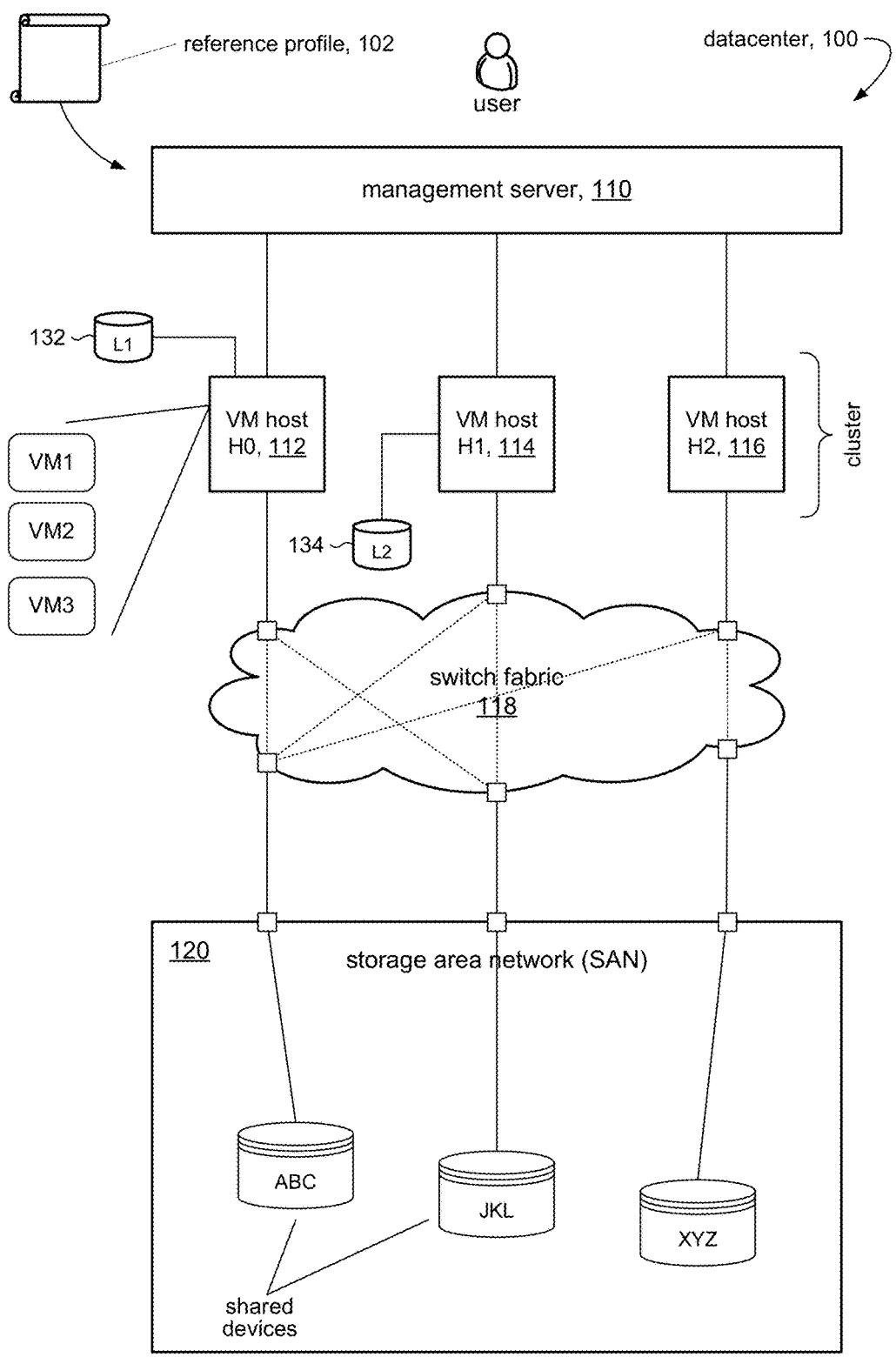
FIG. 1 depicts a high level cluster of host machines in a datacenter.

FIG. 1 illustrates an embodiment of a virtual machine computing environment in a datacenter 100 in accordance with the present disclosure. The datacenter 100 may comprise a management server 110 to manage host machines 112, 114, 116 for hosting virtual machines that comprise the virtual machine computing environment. In particular embodiments, the management server 110 may facilitate the management of the datacenter 100. The management server 110 may provide services such as access control, configuration, performance monitoring, and the like. The vCenter® management system by VMware, Inc. is an example of a management server 110 of a virtual machine computing environment.

The datacenter 100 may further comprise a switch fabric 118. In various embodiments, for example, the switch fabric 118 may be any suitable public or private communication network, and in some embodiments may include public and private elements. A storage system 120 of the datacenter 100 may comprise a storage area network (SAN). In general, the datacenter 100 may comprise any suitable storage architecture or combination of different storage architectures, including for example, but not limited to fibre channel storage arrays, iSCSI storage arrays, NAS storage arrays, SAN, etc. The host machines 112-116 may be grouped together with connections to the same switch fabric 118 and storage system 120 to provide an aggregate set of resources in a virtual environment, sometimes referred to as a "cluster."

Figure 2:
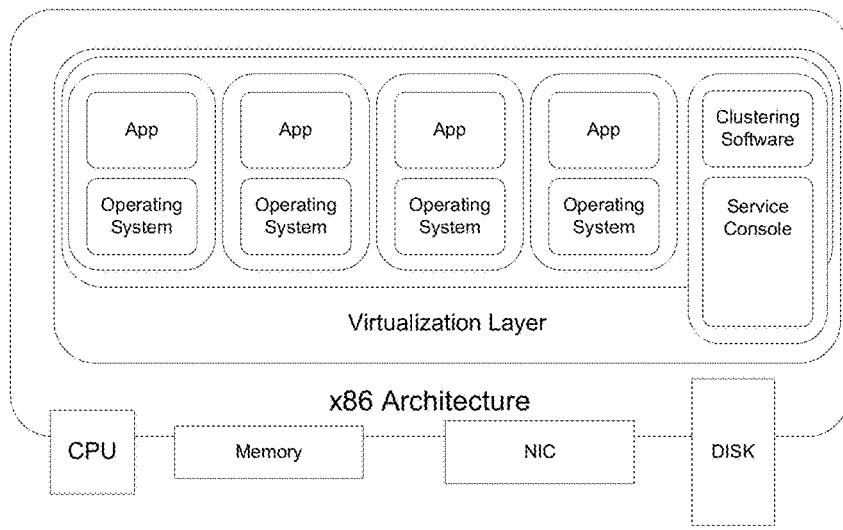
FIG. 2 is a block diagram illustrating components in a host machine.

Each host machine 112-116 may host one or more virtual machines (e.g., VM1, VM2, VM3). Referring for a moment to FIG. 2, a host machine may comprise a computer system having standard hardware components such as a CPU, main memory (e.g., DRAM), network interface card (NIC), and local disk storage. A software layer called the "virtualization layer" may have direct access to the underlying hardware and present a hardware interface that appears to be a machine (virtual machine) on which an operating system (sometimes referred to as a "guest OS") may be installed along with subsequent applications. The ESXi® server provided by Vmware, Inc. is an example of a virtualization layer.

Returning to FIG. 1, in a particular embodiment, the storage system 120 may use a SAN storage architecture. SAN disks are commonly subdivided into more manageable logical disks commonly referred to as logical unit number (LUN) devices. Host machines 112-116 may be configured to access one or more LUNs from storage system 120. A given LUN disk can be accessible from more than one host machine and thus can be shared across the cluster of host machines. More generally, when a storage device is shared by all the host machines in a cluster of host machines, that storage device may be said to be "shared clusterwide." For example, the LUN disk identified as "ABC" is shared clusterwide because it is shared by host machines 112, 114, and 116. By comparison, LUN disk "JKL" is shared by only host machines 112 and 114 and thus would not be considered to be shared clusterwide because it is not shared by all the host machines in the cluster Likewise, LUN disk "XYZ", which is accessible only to host machine 116, is not shared clusterwide and can be regarded as "logically local" even though it is not directly attached to host machine 116.

FIG. 1 further shows that a host machine may have one or more local storage devices connected directly to it. For example, host machine 112 is connected to a local storage device 132 (identified as "L1"), and host machine 114, likewise, is connected to a local storage device 134 (identified as "L2"). Local storage devices L1 and L2 are not shared clusterwide.

It will be appreciated that identifiers for storage devices may be of any suitable format. For example, in some embodiments, the identifiers may conform to the Network Address Authority (NAA) Naming Format for iSCSI Node Names.

The management server 110 may provide tools that allow a user to manually configure components in a host machine. In some embodiments, the management server 110 may use a reference profile 102 to facilitate the management of the datacenter 100. The reference profile 102 may serve as a reference to assess (compliance check) the configuration of other host machines in a cluster. For example, if the reference profile lists a device D with configuration settings S, then a host machine that is in compliance will be able to access device D, and on that host machine, device D will be configured with settings that correspond to settings S.

The management server 110 may include a profiling tool to generate the reference profile 102 from a reference host, which in some embodiments may be one of the host machines in a cluster of host machines. The profiling tool can also be used to extract a temporary profile from a host machine that is being assessed for compliance. The target host machine can be assessed by comparing the reference profile with the temporary profile extracted from that target host machine. For example, the profiling tool may interact with a host machine to obtain a list of the storage devices that are accessible from that host machine. The profiling tool may obtain the corresponding settings that the host machine has for each storage device.

Figure 3A:
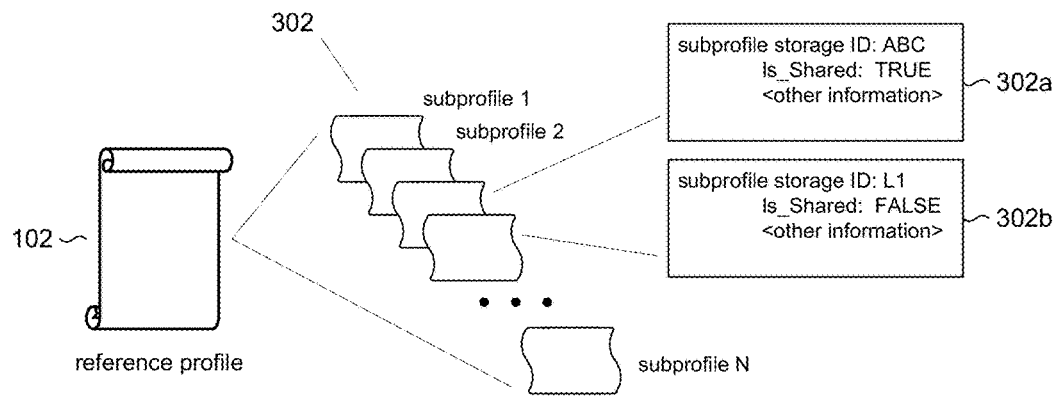
FIGS. 3A and 3B illustrate aspects of profiles in accordance with the present disclosure.

A reference profile or temporary profile may comprise configuration details about the elements comprising the host machine from which the profile was extracted. In some embodiments, the profile may comprise several subprofiles. Each subprofile, in turn, may specify the configuration of a component comprising the corresponding host machine. Merely as examples, and by no means exhaustive, configurable components in a host machine whose settings may be captured in a profile include elements such as memory, storage, network communications, date and time, firewall protection, user accounts, user groups, and so on. Settings may include, for example, amount of memory, names of disks, network addresses, account names, and so on. Referring to FIG. 3A, for example, a reference profile (e.g., reference profile 102) may comprise subprofiles 302 that represent configurations in host machine 112.

In accordance with the present disclosure, storage devices accessible by a host machine may be represented by respective subprofiles. Each subprofile may include a set of data comprising an identifier of the storage device and a sharing state of the storage device as it is configured in that host machine. In accordance with the present disclosure, the sharing state of a storage device may be a boolean value that indicates whether or not that storage device is shared clusterwide.

FIG. 3A, for example, illustrates an example of storage device subprofiles 302a, 302b in the reference profile according to some embodiments. The subprofile 302a comprises a storage ID for LUN "ABC" and has a sharing state (Is_Shared) of TRUE, indicating that the LUN is shared clusterwide. The subprofile 302b illustrates an example of subprofile for a local storage device. Here, the storage ID identifies device L1, which in our example in FIG. 1 is local to host machine 112. Accordingly, the sharing state Is_Shared is set to FALSE to indicate that device L1 is not shared clusterwide. The storage devices referenced in the reference profile may be referred to as "profile devices." The subprofiles that comprise the reference profile may be referred to as "profile data sets."

Figure 3B:
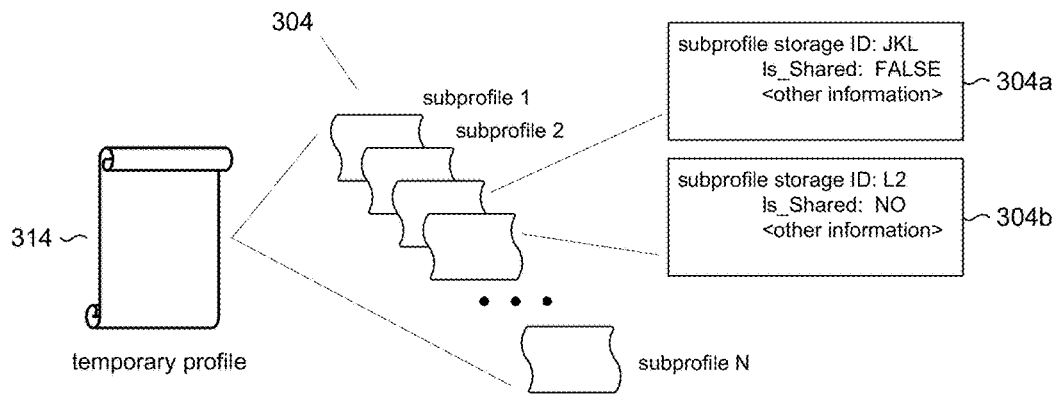

As noted above, in general, a temporary profile may be extracted from any host machine. FIG. 3B, for example, illustrates an example of a temporary profile 314 that represents configurations in host machine 114. The subprofile 304a, for example, represents a storage device and comprises a storage ID for LUN "JKL" and has a sharing state (Is_Shared) of FALSE, indicating that the LUN is not shared clusterwide. The subprofile 304b illustrates an example of subprofile for local storage device L2, which is local to host machine 114. The sharing state Is_Shared in subprofile 304b is set to FALSE. The storage devices referenced in the temporary profile may be referred to as "host devices." The subprofiles that comprise the temporary profile may be referred to as "host data sets."

Figure 4:
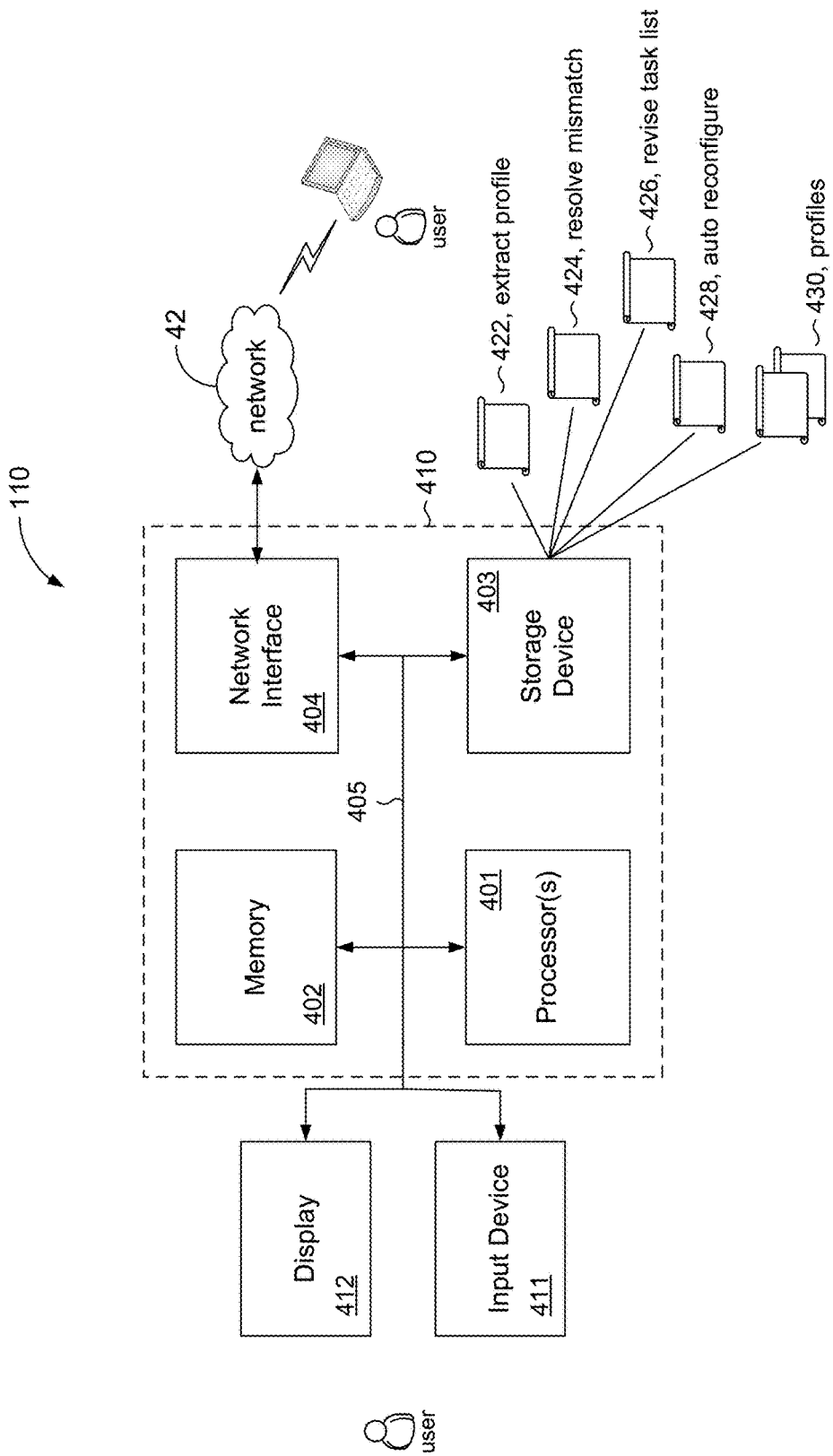
FIG. 4 is a block diagram illustrating components in management server.

FIG. 4 illustrates an example of a specific embodiment of management server 110 in accordance with the present disclosure. In particular embodiments, the management server 110 may facilitate the management of the datacenter 100, including managing the reference profile 102. In various embodiments, the management server 110 may perform one or more of generating the reference profile 102, using the reference profile to configure and reconfigure host machines, using the reference profile to assess compliance of host machines, and the like.

The management server 110 may include a computer 410 connected to I/O devices, such as a display 412 and suitable input device(s) 411 such as a keyboard, a mouse, and so on to allow a user to access the management server. The computer 410 may include a processor component 401 that comprise a single processor (e.g., central processing unit, CPU) or a configuration of many processors. A memory component 402 may include dynamic memory (e.g., DRAM) and static memory (e.g., flash memory).

A storage device component 403 may provide read/writeable mass storage capability (e.g., magnetic disk drives) and/or read-only storage (e.g., CD discs). The storage device component 403 may store profiles 430 such as the reference profile 102 and a temporary profile extracted from a target host being assessed for compliance. The storage device component 403 may store computer executable program code (e.g., applications 422-428) which when executed by the processor component 401 cause the processor component to perform various actions disclosed herein.

The computer 410 may be connected to suitable network interface component 404 for communication over a suitable communication network 42, such as a local network or a public access network. Users may access the management server 110 locally via I/O devices 411, 412, or remotely via the communication network 42. A system bus 405 may provide control and/or data bus lines to interconnect these elements.

Figure 5:
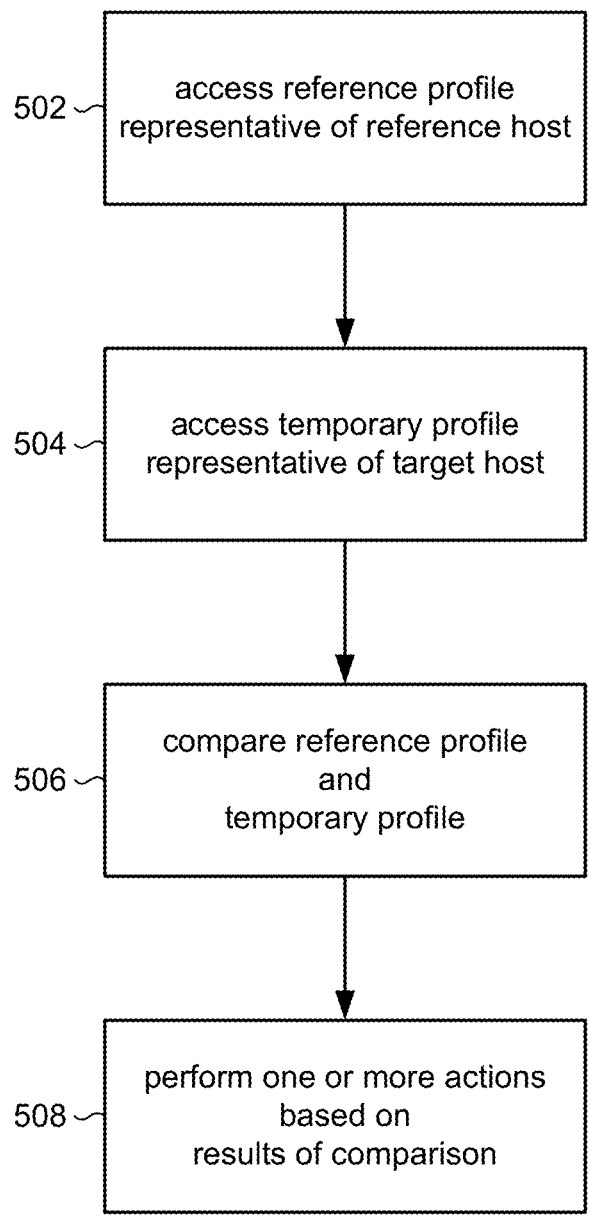
FIG. 5 is a high level flow diagram for assessing a host machine configuration using profiles.

The discussion will now turn to a description of how a target host machine may be reconfigured, in terms of its storage configuration, to conform to a reference profile, for example, during a compliance checking action. FIG. 5 shows a high level block diagram outlining basic steps in the process in accordance with some embodiments, which, for example, may be performed by applications (e.g., 422, 424, FIG. 4) in the management server 110. The process may be initiated by a user or may be automated (e.g., as part of a maintenance schedule). Though the following description describes actions being performed by the management server, it will be appreciated that processing may occur other than in the management server.

At block 502, the management server can access a previously generated reference profile. As explained above, the reference profile represents configurations in a reference host machine. At block 504, the management server can extract or otherwise access the profile (temporary profile) of a host machine that is the target of the compliance checking activity (target host machine).

At block 506, the temporary profile can be compared against the reference profile to identify differences in terms of the configuration information in the target host machine of storage devices accessible by the target host machine and the configuration information in the reference host machine of storage devices accessible by the reference host machine. In accordance with the present disclosure, the comparison can take into account the locality of storage devices referenced in the reference profile and temporary profile. As used herein, the term "locality" is a property of the storage device and refers to whether the storage device is shared clusterwide or not.

At block 508, the management server may perform one or more actions depending on the results of the comparison. In some embodiments, for example, actions may include notifying a user such as a system administrator. In other embodiments, actions may include taking action on the target host machine.

Figure 6:
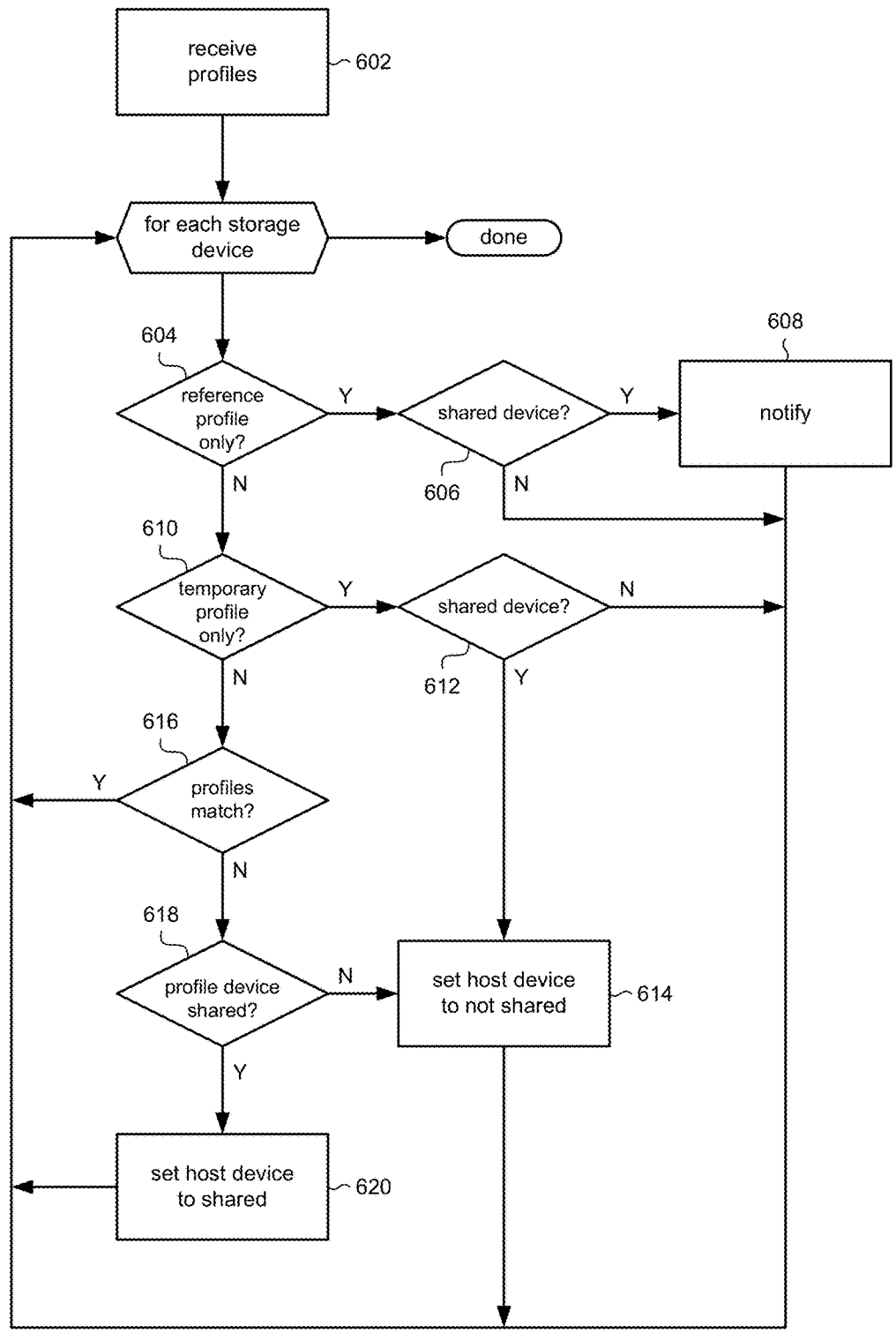
FIG. 6 provides additional details shown in FIG. 5.

These foregoing aspects of the present disclosure will now be described in more detail with reference to FIG. 6. Thus, at block 602 the management server may access or otherwise receive a reference profile (from the reference host machine) and a temporary profile from the target host machine being assessed. In some embodiments, the reference profile may be a previously generated profile extracted from a host machine in a cluster of host machines. For example, a profiling tool may be run on a host machine that was selected to be a reference host machine to extract a profile that would serve as the reference profile. The profiling tool may also be used to extract the temporary profile from the target host machine.

In accordance with the present disclosure, a loop may be processed for each storage device that is listed (e.g., referenced in a subprofile) in either the reference profile or temporary profile. At block 604, if a given storage device is listed in the reference profile and not in the temporary profile (e.g., the given storage device is accessible only by the reference host), then processing may proceed to block 606. If, at block 606, the given storage device is designated as being shared clusterwide (e.g., the Is_Shared sharing state in the subprofile for the given storage device is TRUE), then processing may proceed to block 608. At this point, we have a storage device that accessible only by the reference host, but is designated as being shared clusterwide. This can be deemed to be a configuration mismatch that warrants action. Accordingly, at block 608, in some embodiments, the management server may issue a warning or otherwise raise a suitable alarm to notify an administrative user of the situation (e.g., warn that the given storage device may not be properly zoned). The processing loop can continue with another storage device in the reference profile or temporary profile.

If, at block 604, the given storage device is not listed only in the reference profile, then processing may proceed to block 610. If, at block 610, the given storage device is listed in temporary profile and not in the reference profile (e.g., the given storage device is accessible only by the target host machine), then processing may proceed to block 612. If, at block 612, the given storage device is not designated as being shared clusterwide (e.g., the Is_Shared sharing state in the subprofile for the given storage device is FALSE), then the processing loop can continue with another storage device in the reference profile or temporary profile. Since the given storage device is accessible only by the target host machine and is designated as not being shared clusterwide, nothing more needs to be done; this may be deemed to be a correct configuration for the given storage device.

If, at block 612, the given storage device is designated as being shared clusterwide, then processing may proceed to block 614. At this point, we have a storage device that is accessible only by the target host machine, but designated as being shared clusterwide. This may indicate that the locality of the given storage device as configured in the target host machine is incorrect. Accordingly, at block 614, in some embodiments, the management server may set configuration information in the target host machine corresponding to the given storage device to indicate it is not shared clusterwide (e.g., set Is_Shared to FALSE). The processing loop can continue with another storage device in the reference profile or temporary profile.

If, at block 610, the given storage device is not listed only in the temporary profile, then processing may proceed to block 616. At this point, the given storage device has been determined to be accessible by both the reference host machine and the target host machine. If, at block 616, the sharing state of the given storage device in the reference profile matches the sharing state of the given storage device in the temporary profile, then the target host machine may be deemed to be in compliance with the reference profile with respect to the given storage device. Accordingly, the management server may take no action with respect to the given storage device and the processing loop can continue with another storage device in the reference profile or temporary profile.

If, at block 616, the sharing state of the given storage device in the reference profile does not match the sharing state of the given storage device in the temporary profile, this can serve as an indication of a configuration mismatch, and processing may proceed to block 618. If at, block 618, the sharing state of the given storage device in the reference profile indicates it is not shared clusterwide, then processing may proceed to block 614 in order to set configuration information in the target host machine corresponding to the given storage device to indicate that the device is not shared clusterwide (e.g., set Is_Shared to FALSE) although it is shared between the reference host and the target host. If, on the other hand at block 618, the sharing state of the given storage device in the reference profile indicates it is shared clusterwide, then processing may proceed to block 620 in order to set the configuration information in the target host machine corresponding to the given storage device to indicate it is shared clusterwide (e.g., set Is_Shared to TRUE). The processing loop can continue with another storage device in the reference profile or temporary profile.

Figure 7:
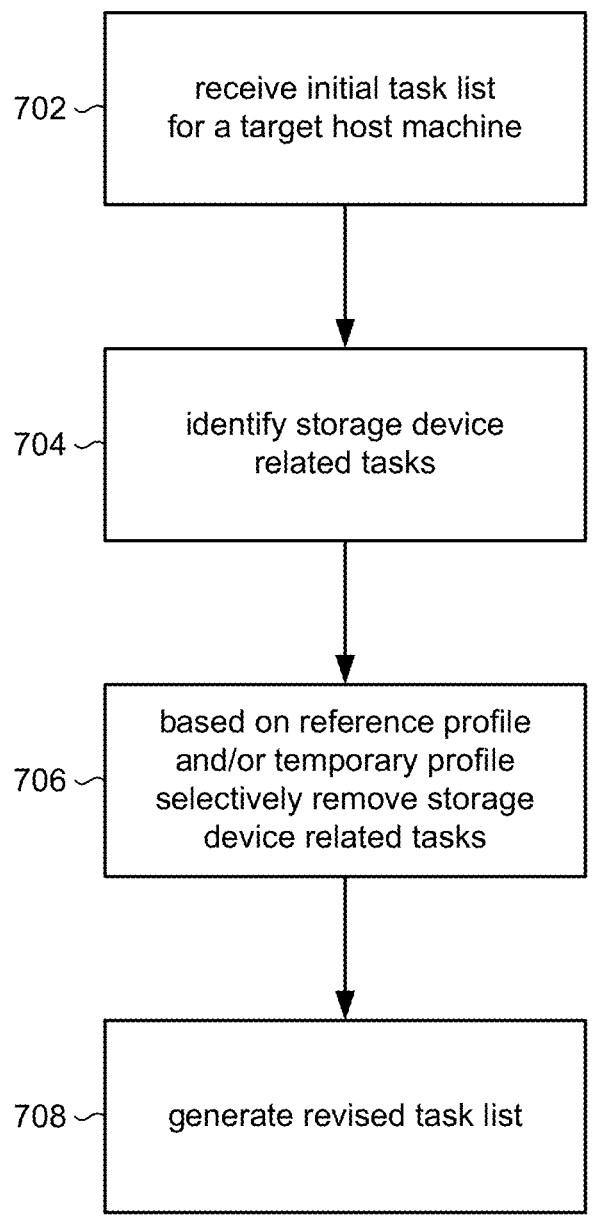
FIG. 7 is a high level flow diagram for modifying tasks lists in accordance with the present disclosure.
Figure 8:
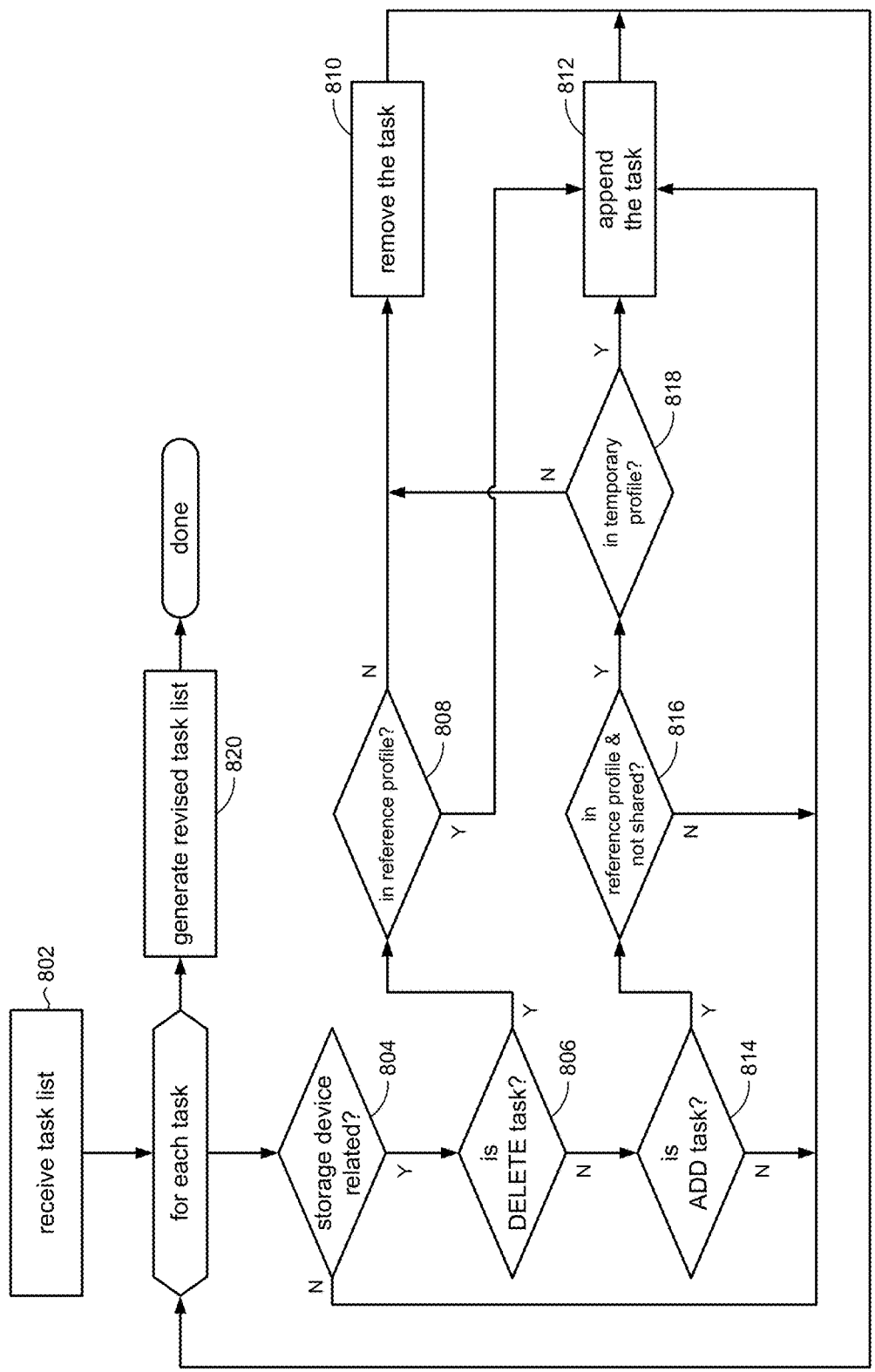
FIG. 8 provides additional details shown in FIG. 7.

Turning now to FIGS. 7 and 8, in some embodiments, the management server 110 may use task lists in order to bring configurations in a host machine into conformance with a reference profile. A task list may include tasks to delete host state that does not match the reference profile and tasks which add host state that is absent from the host but otherwise appears in the reference profile. The task list may include modifying host state, which can be decomposed into an equivalent set of add tasks and delete tasks. In accordance with the present disclosure, a previously generated task list may be "pruned" to take into account for the locality of storage devices that are tagged by tasks in a task list.

FIG. 7 shows a high level general block diagram outlining basic steps for task list processing in accordance with some embodiments of the present disclosure. A task list may set forth tasks that are used to configure a host machine. In accordance with the present disclosure, tasks in a task list for a target host machine that relate to storage devices may be revised based on a reference profile. The process may be initiated by a user or may be automated (e.g., as part of a maintenance schedule). Though the following description describes actions being performed by applications (e.g., 426, FIG. 4) the management server 110, it will be appreciated that processing may occur other than in the management server.

At block 702, the management server may receive an initial task list for a target host machine. At block 704, tasks related to (tagged with) storage devices may be identified. Such tasks may include tasks that modify some configuration information in the target host machine for a given storage device that is accessible by the target host machine. In accordance with the present disclosure, tasks that are not tagged for storage devices may be left unchanged. At block 706, tasks that that are tagged with a storage device may be removed depending on whether they are listed in the reference profile and/or in the temporary profile, and on the locality of the tagged storage device. At block 708, a revised task list may be generated by removing one or more tasks from the initial task list.

These aspects of the present disclosure will now be described in more detail with reference to FIG. 8. At block 802, the management server may access or otherwise receive a previously generated task list to be applied to a target host machine. In accordance with the present disclosure, a loop may be processed for each task in the received task list in order to bring the target host machine into compliance with the reference profile.

At block 804, if a given task is not tagged with, related to, or otherwise associated with a storage device, then processing may proceed to block 812. For example, a task that configures communication parameters in the target host machine would not be tagged with a storage device. A task that configures the time in the host machine would not be tagged with a storage device. A task that configures services in the host machine would not be tagged with a storage device, and so on. Accordingly at block 812, when a given task is not tagged with a storage device the given task may be written to the revised task list. The processing loop can continue with another task in the received task list.

At block 804, if the given task is tagged with a storage device, then processing may proceed to block 806. At block 806, if the given task is a task to delete host state (e.g., a DELETE task), then processing may proceed to block 808. In some embodiments, for example, a DELETE task may delete configuration information from the target host machine corresponding to the storage device identified by the DELETE task.

At block 808, if the storage device that is the target of the DELETE task does not appear in the reference profile, then processing may proceed to block 810 where the task can be removed so that it is not added to the revised task list. The DELETE task is filtered out from the initial received task list and thus the revised task list does not contain an operation upon the corresponding target host state. Since the storage device is not listed in the reference profile, that storage device may be deemed to not have a role in terms of compliance with the reference host machine. Accordingly, there is no need to delete the configuration information from the target host machine for that storage device, and in some embodiments, the DELETE task can be omitted from the revised task list. The processing loop can continue with another task in the received task list.

At block 808, if the storage device that is the target of the DELETE task does appear in the reference profile, then processing may proceed to block 812, where the DELETE task is written to the revised task list. Since the storage device is listed in the reference profile, that storage device may be deemed to have a role in terms of compliance with the reference host machine. Accordingly, in some embodiments, the DELETE task that appears in the initial task list should be undisturbed and thus retained in the revised task list. The processing loop can continue with another task in the received task list.

At block 806, if the given task is not a DELETE task, then processing may proceed to block 814. At block 814, if the given task is a task to add host state (e.g., an ADD task), then processing may proceed to block 816. In some embodiments, for example, an ADD task may add configuration information to the target host machine corresponding to the storage device identified by the ADD task.

At block 816, if the storage device that is the target of the ADD task is listed in the reference profile and that target storage device is not shared clusterwide, then processing may proceed to block 818. At block 818, if the target storage device is not listed in the temporary profile, then processing may proceed to block 810 where the task can be removed so that it is not added to the revised task list. Since the storage device that is the target of the ADD task is accessible by the reference host machine and is designated as not being shared clusterwide, in some embodiments, the ADD task is filtered out and omitted from the revised task list. The processing loop can continue with another task in the received task list.

At block 818, if the target storage device is listed in the temporary profile, then processing may proceed to block 812. For example, the target host machine may in fact be the reference host machine. Or, the storage device may be shared between some but not all host machines in the cluster of host machines. In some embodiments, we may want to enforce the configuration of the storage device on any host machine that can access the storage device. Accordingly, the ADD task may be added to the revised task list. Similarly, at block 816, if the target storage device is listed in the reference profile and that target storage device is shared clusterwide, then processing may proceed to block 812 where the ADD task can be added to the revised task list. The processing loop can continue with another task in the received task list.

Figure 9:
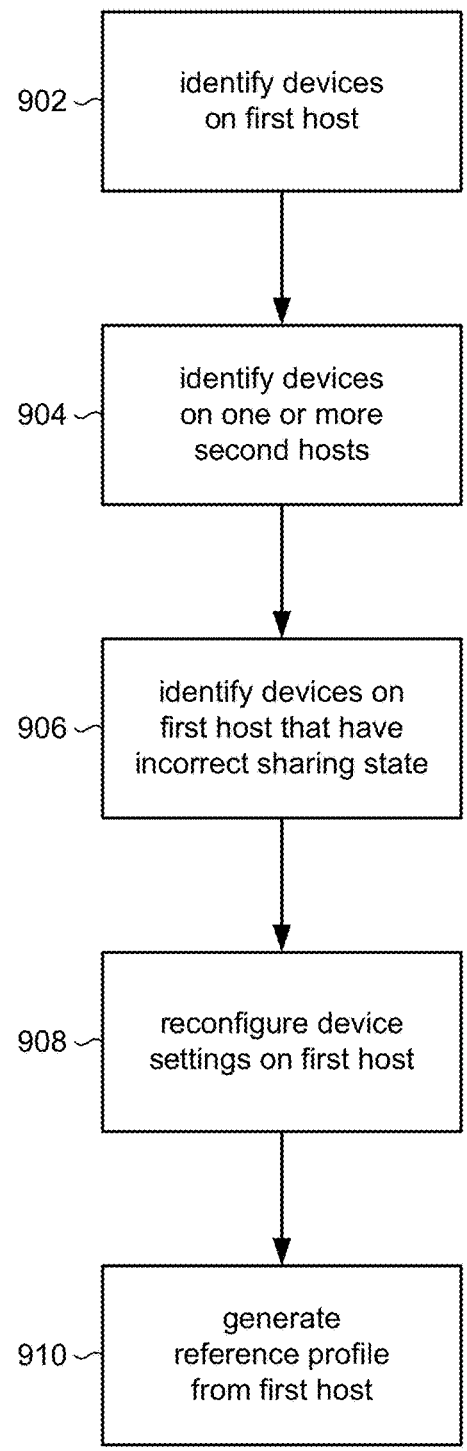
FIG. 9 is a high level flow diagram for auto-reconfiguring a host machine in accordance with the present disclosure.
Figure 10:
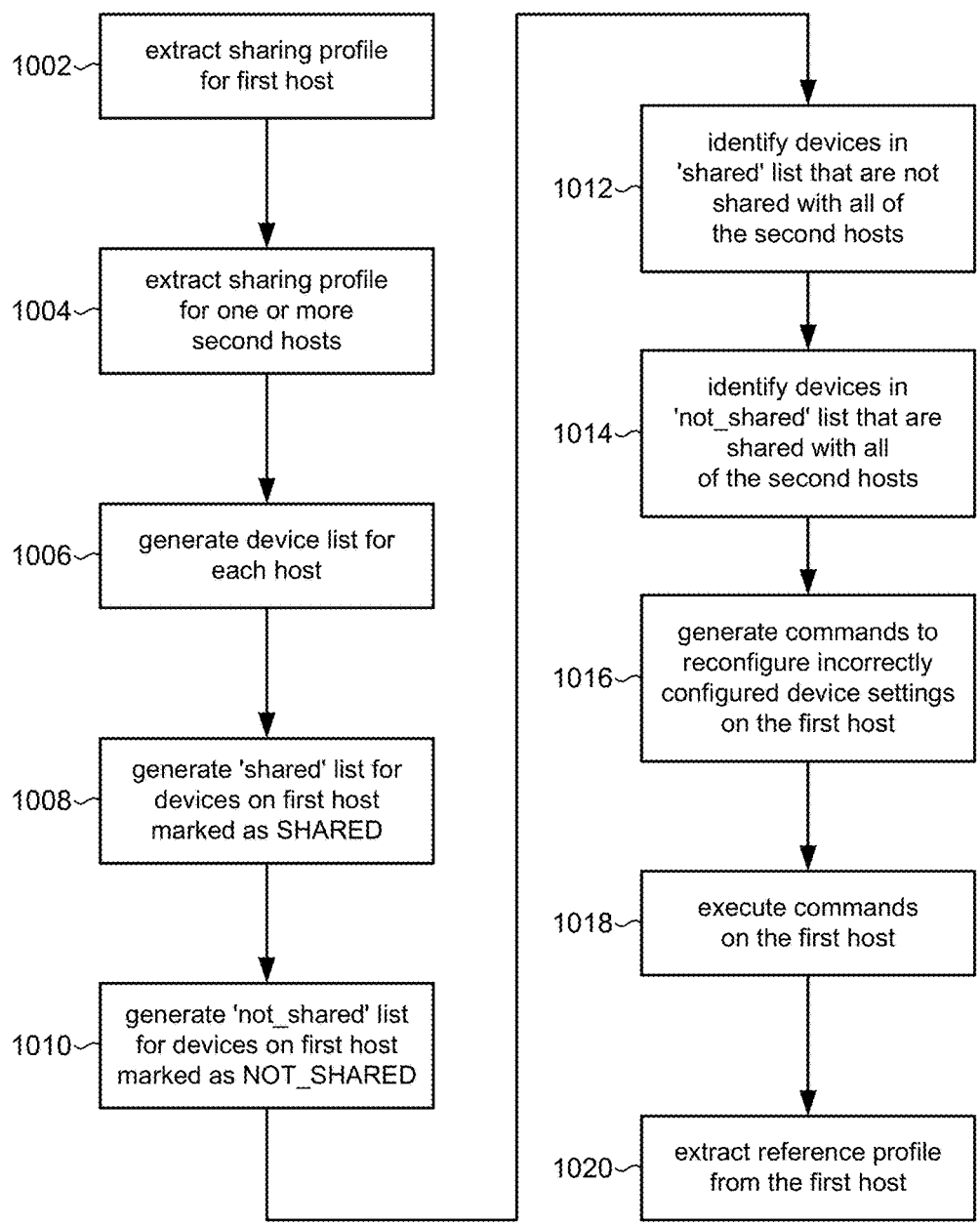
FIG. 10 provides additional details for the flow diagram shown in FIG. 9.

Referring to FIGS. 9 and 10, in accordance with the present disclosure, the management server 110 may include an automation tool (e.g., 428) to facilitate generating a reference profile. In accordance with some embodiments, the automation tool may reconfigure settings in a candidate host machine in a cluster of host machines to serve as a reference host machine by comparing the candidate host machine with one or more other host machines in the cluster.

FIG. 9 shows a high level general block diagram outlining basic steps for auto-reconfiguration of a host machine in accordance with some embodiments. Though the following description describes actions being performed by the management server 110, it will be appreciated that processing may occur other than in the management server. In some embodiments, for example, the process may be performed on the candidate host machine.

At block 902, the management server may identify storage devices accessible by a candidate host machine (first host) that can serve as a reference host. In some embodiments, a user may specify the candidate host. The user may trigger this process, for example, by initiating a host profile extraction for the purpose of generating a reference profile, where the management server first performs an auto-reconfiguration before generating the reference profile.

At block 904, the management server may identify storage devices accessible by at least one other host machine (second host). At block 906, the management server may identify storage devices accessible by the first host that have an incorrect sharing state with respect to storage devices accessible by the second host.

At block 908, the management server may reconfigure settings on the first host that correspond to storage devices accessible by the first host according to results from block 906. At block 910, the management server may then extract a profile from the first host, which can serve as the reference profile.

These aspects of the present disclosure will now be described in more detail with reference to FIG. 10. At block 1002, the management server may extract a sharing profile from the first host. In some embodiments, the sharing profile may comprise a list of storage devices accessible from the first host. For each storage device, the sharing profile may include a suitable identifier and corresponding configuration data as stored in the first host (e.g., the Is_Shared boolean) that indicates whether the storage device is shared clusterwide or not. Similarly, at block 1004, the management server may extract a similar sharing profile from a second host.

At block 1006, a list of storage devices accessible from the first host may be generated from the sharing profile obtained at block 1002. Likewise, a list of storage devices accessible from the second host may be generated from the sharing profile obtained at block 1004.

At block 1008, the management server may generate a "shared" list from the sharing profile obtained at block 1002. In some embodiments, the shared list may be a list of storage devices accessible by the first host that are designated in the first host as being shared clusterwide (e.g., Is_Shared is set to TRUE). Similarly, at block 1010, the management server may generate a "not-shared" list from the sharing profile obtained at block 1002. In some embodiments, the not-shared list may be a list of storage devices accessible by the first host that are designated in the first host as being not shared clusterwide (e.g., Is_Shared is set to FALSE).

At block 1012, the management server may identify storage devices in the shared list (generated in block 1008) that are not accessible from the second host. For example, the list of storage devices accessible from the first host and the list of storage devices accessible from the second host (generated in block 1006) may be compared to identify storage devices that are accessible from the first host but not the second host, and storage devices that are accessible from the second host but not the first host. These storage devices may be compared with the shared list generated in block 1008 to identify storage devices that appear in the shared list, but are not accessible from the second host. Recall that the shared list generated in block 1008 represents storage devices that are accessible by the first host and are designated as being shared clusterwide. Therefore, the storage devices identified in block 1012 may represent storage devices that are accessible from the first host that may be misconfigured; e.g., incorrectly designated as being shared clusterwide.

At block 1014, the management server may identify storage devices in the not-shared list (generated in block 1010) that are accessible from the first host and the second host. For example, the list of storage devices accessible from the first host and the list of storage devices accessible from the second host (generated in block 1006) may be compared to identify storage devices that are accessible by both the first host and the second host. These storage devices may be compared with the not-shared list generated in block 1010 in order to identify storage devices that appear in the not-shared list, but are accessible from both the first host and the second host. Since the not-shared list generated in block 1010 represents storage devices that are accessible by the first host and are designated as being not shared clusterwide, the storage devices identified in block 1014 may therefore represent storage devices accessible from the first host that may be misconfigured; e.g., incorrectly designated as being not shared.

At block 1016, the management server may generate commands to reconfigure settings on the first host that correspond to storage devices that are deemed to be misconfigured. For example, the storage devices identified in block 1012 and the storage devices identified in block 1014 may be deemed to be misconfigured in terms of their sharing state. Accordingly, commands may be generated to change the sharing states stored in the first host.

At block 1018, the management server may execute the commands on the first host or otherwise cause the commands to be executed on the first host. The commands can then reconfigure the sharing setting for the storage devices accessible from the first host machine to match the actual accessibility of storage devices from the first and second host machines.

At block 1020, the management server may extract a profile from the first host machine. That profile may serve as a reference profile for the cluster of host machines.

It can be appreciated that additional second host machines may be processed in order to obtain a more accurate representation of the configuration of the cluster. Thus, for example, at block 1004 additional sharing profiles may be extracted from one or more additional second host machines. At block 1006, device lists for the additional second host machines may be generated. At blocks 1012 and 1014, storage devices from the additional second host machines may be considered to obtain a more accurate assessment of what has to be reconfigured on the first host machine.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
   accessing, by a computer processor, a first task list comprising a plurality of tasks, tasks in the plurality of tasks being operations that configure a target host machine to bring the target host machine into conformance with a reference host machine;
   when a task from the first task list does not specify to add or delete configuration information corresponding to a storage device to or from the target host machine, then adding, by the computer processor, the task to a second task list; and
   when a task in the first task list specifies to add or delete configuration information corresponding to a storage device to or from the target host machine, then selectively adding, by the computer processor, the task to the second task list depending on whether the storage device associated with the task is accessible by the reference host machine,
   wherein the second task list is used in place of the first task list, wherein tasks in the second task list are operations to configure the target host machine to bring the target host machine into conformance with the reference host machine.

2. The method of claim 1, wherein a DELETE task in the first task list is added to the second task list when the storage device associated with the DELETE task is accessible by the reference host machine.

3. The method of claim 1, wherein a DELETE task in the first task list is omitted from the second task list when the storage device associated with the DELETE task is not accessible by the reference host machine.

4. The method of claim 1, wherein an ADD task in the first task list is added to the second task list when the storage device associated with the ADD task is accessible by the reference host machine and is marked in the reference host machine as being not shared among host machines in a cluster of host machines and the storage device associated with the ADD task is accessible by the target host machine.

5. The method of claim 1, wherein an ADD task in the first task list is added to the second task list when the storage device associated with the ADD task is accessible by the reference host machine and the storage device associated with the ADD task is marked in the reference host machine as being shared among host machines in a cluster of host machines.

6. The method of claim 1, wherein an ADD task in the first task list is omitted from the second task list when the storage device associated with the ADD task is accessible by the reference host machine and is marked in the reference host machine as being not shared among host machines in a cluster of host machines and the storage device associated with the ADD task is not accessible by the target host machine.

7. The method of claim 1, further comprising:
when a task in the first task list is a DELETE task that is associated with a storage device, then selectively adding the DELETE task to the second task list depending on whether the storage device associated with the DELETE task is accessible by the reference host machine; and
when a task in the first task list is an ADD task that is associated with a storage device, then selectively adding the ADD task to the second task list depending on whether the storage device associated with the ADD task is accessible by the reference host machine and accessible by the target host machine.

8. A non-transitory computer-readable storage medium having stored thereon computer executable instructions, which when executed by a computer device, cause the computer device to:
access a first task list comprising a plurality of tasks, tasks in the plurality of tasks being operations that configure a target host machine to bring the target host machine into conformance with a reference host machine;
when a task from the first task list does not specify to add or delete configuration information corresponding to a storage device to or from the target host machine, then add the task to a second task list; and
when a task in the first task list specifies to add or delete configuration information corresponding to a storage device to or from the target host machine, then selectively add the task to the second task list depending on whether the storage device associated with the task is accessible by the reference host machine, wherein the second task list is used in place of the first task list, wherein tasks in the second task list are operations to configure the target host machine to bring the target host machine into conformance with the reference host machine.

9. The non-transitory computer-readable storage medium of claim 8, wherein the computer executable instructions, which when executed by the computer device, further cause the computer device to:
selectively add a DELETE task that occurs in the first task list to the second task list depending on whether the storage device associated with the DELETE task is accessible by the reference host machine; and
selectively add an ADD task that occurs in the first task list to the second task list depending on whether the storage device associated with the ADD task is accessible by the reference host machine and accessible by the target host machine.

10. The non-transitory computer-readable storage medium of claim 8, wherein a DELETE task in the first task list is added to the second task list when the storage device associated with the DELETE task is accessible by the reference host machine.

11. The non-transitory computer-readable storage medium of claim 8, wherein a DELETE task in the first task list is omitted from the second task list when the storage device associated with the DELETE task is not accessible by the reference host machine.

12. The non-transitory computer-readable storage medium of claim 8, wherein an ADD task in the first task list is added to the second task list when the storage device associated with the ADD task is accessible by the reference host machine and is marked in the reference host machine as being not shared among host machines in a cluster of host machines and the storage device associated with the ADD task is accessible by the target host machine.

13. The non-transitory computer-readable storage medium of claim 8, wherein an ADD task in the first task list is added to the second task list when the storage device associated with the ADD task is accessible by the reference host machine and the storage device associated with the ADD task is marked in the reference host machine as being shared among host machines in a cluster of host machines.

14. The non-transitory computer-readable storage medium of claim 8, wherein an ADD task in the first task list is omitted from the second task list when the storage device associated with the ADD task is accessible by the reference host machine and is marked in the reference host machine as being not shared among host machines in a cluster of host machines and the storage device associated with the ADD task is not accessible by the target host machine.

15. An apparatus comprising:
one or more computer processors; and
a computer-readable storage medium comprising instructions for controlling the one or more computer processors to be operable to:
access a first task list comprising a plurality of tasks, tasks in the plurality of tasks being operations that configure a target host machine to bring the target host machine into conformance with a reference host machine;
when a task from the first task list does not specify to add or delete configuration information corresponding to a storage device to or from the target host machine, then add the task to a second task list; and
when a task in the first task list specifies to add or delete configuration information corresponding to a storage device to or from the target host machine, then selectively add the task to the second task list depending on whether the storage device associated with the task is accessible by the reference host machine,
wherein the second task list is used in place of the first task list, wherein tasks in the second task list are operations to configure the target host machine to bring the target host machine into conformance with the reference host machine.

16. The apparatus of claim 15, wherein the computer-readable storage medium further comprises instructions for controlling the one or more computer processors to be operable to:
selectively add a DELETE task that occurs in the first task list to the second task list depending on whether the storage device associated with the DELETE task is accessible by the reference host machine; and
selectively add an ADD task that occurs in the first task list to the second task list depending on whether the storage device associated with the ADD task is accessible by the reference host machine and accessible by the target host machine.

17. The apparatus of claim 15, wherein a DELETE task in the first task list is added to the second task list when the storage device associated with the DELETE task is accessible by the reference host machine.

18. The apparatus of claim 15, wherein an ADD task in the first task list is added to the second task list when the storage device associated with the ADD task is accessible by the reference host machine and is marked in the reference host machine as being not shared among host machines in a cluster of host machines and the storage device associated with the ADD task is accessible by the target host machine.

19. The apparatus of claim 15, wherein an ADD task in the first task list is added to the second task list when the storage device associated with the ADD task is accessible by the reference host machine and the storage device associated with the ADD task is marked in the reference host machine as being shared among host machines in a cluster of host machines.

20. The apparatus of claim 15, wherein an ADD task in the first task list is omitted from the second task list when the storage device associated with the ADD task is accessible by the reference host machine and is marked in the reference host machine as being not shared among host machines in a cluster of host machines and the storage device associated with the ADD task is not accessible by the target host machine.

\* \* \* \* \*